(12) United States Patent
Fricke et al.

(10) Patent No.: US 10,738,844 B2
(45) Date of Patent: Aug. 11, 2020

(54) DISC BRAKE FOR A UTILITY VEHICLE

(71) Applicant: KNORR-BREMSE Systeme fuer Nutzfahrzeuge GmbH, Munich (DE)

(72) Inventors: Jens Fricke, Vilshofen (DE); Markus Molnar, Fuerstenzell (DE); Matthias Adelung, Fuerstenzell (DE); Andreas Petschke, Neuburg am Inn (DE); Josef Schropp, Eichendorf (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 61 days.

(21) Appl. No.: 15/948,339

(22) Filed: Apr. 9, 2018

(65) Prior Publication Data
US 2018/0223920 A1 Aug. 9, 2018

Related U.S. Application Data

(63) Continuation of application No. PCT/EP2016/074156, filed on Oct. 10, 2016.

(30) Foreign Application Priority Data

Oct. 9, 2015 (DE) .................... 10 2015 117 285
Mar. 17, 2016 (DE) .................... 10 2016 104 969

(51) Int. Cl.
*F16D 55/226* (2006.01)
*F16D 65/18* (2006.01)
(Continued)

(52) U.S. Cl.
CPC ......... *F16D 55/226* (2013.01); *F16D 55/224* (2013.01); *F16D 65/0056* (2013.01);
(Continued)

(58) Field of Classification Search
CPC .............. F16D 55/226; F16D 65/0056; F16D 2055/0008; F16D 65/183; F16D 65/0978;
(Continued)

(56) References Cited

U.S. PATENT DOCUMENTS 3,920,104 A 11/1975 Hoffmann
4,878,564 A * 11/1989 Kondo .................. F16D 55/227
188/73.31
(Continued)

FOREIGN PATENT DOCUMENTS

CN 1664396 A 9/2005
CN 1737398 A 2/2006
(Continued)

OTHER PUBLICATIONS

International Search Report (PCT/ISA/210) issued in PCT Application No. PCT/EP2016/074156 dated Jan. 26, 2017 with English translation (six (6) pages).
(Continued)

*Primary Examiner* — Pamela Rodriguez
(74) *Attorney, Agent, or Firm* — Crowell & Moring LLP

(57) ABSTRACT

A disc brake for a utility vehicle is provided. The disc brake includes a brake caliper overlapping a brake disc, the brake caliper being held on a brake carrier located on the vehicle in an axially displaceable manner with respect to the brake disc. The brake carrier has brake lining slots on opposite sides of the brake disc defined by brake carrier lugs on the entry and the exit side. Each slot receives a brake lining having a brake plate and a friction lining fastened thereto, configured such that each brake lining is supported at least at the entry side in the direction of rotation of the brake disc on the entry side brake carrier lug during braking.

11 Claims, 28 Drawing Sheets

(51) Int. Cl.
*F16D 65/00* (2006.01)
*F16D 65/097* (2006.01)
*F16D 55/224* (2006.01)
*F16D 65/092* (2006.01)
*F16D 65/095* (2006.01)
*F16D 55/00* (2006.01)

(52) U.S. Cl.
CPC ......... *F16D 65/092* (2013.01); *F16D 65/095* (2013.01); *F16D 65/097* (2013.01); *F16D 65/0974* (2013.01); *F16D 65/0978* (2013.01); *F16D 65/183* (2013.01); *F16D 2055/0008* (2013.01); *F16D 2055/0029* (2013.01)

(58) Field of Classification Search
CPC .... F16D 55/224; F16D 65/092; F16D 65/095; F16D 65/097; F16D 65/0974; F16D 2055/0029
USPC ................... 188/73.31, 73.32, 73.39, 250 B
See application file for complete search history.

(56) References Cited

U.S. PATENT DOCUMENTS

| | | | |
|---|---|---|---|
| 6,286,636 B1 | 9/2001 | Iwata | |
| 8,544,614 B1 | 10/2013 | Plantan et al. | |
| 8,973,240 B2* | 3/2015 | Plantan | F16D 65/092 |
| | | | 29/428 |
| 10,480,600 B2* | 11/2019 | Schoenauer | F16D 65/0978 |
| 2006/0054425 A1 | 3/2006 | Maehara | |
| 2011/0073418 A1* | 3/2011 | Kim | F16D 65/0972 |
| | | | 188/73.43 |
| 2014/0048360 A1 | 2/2014 | Plantan et al. | |

FOREIGN PATENT DOCUMENTS

| | | |
|---|---|---|
| CN | 1865727 A | 11/2006 |
| CN | 102027257 A | 4/2011 |
| CN | 104583630 A | 4/2015 |
| DE | 21 38 776 A | 2/1973 |
| DE | 22 55 678 A1 | 5/1974 |
| DE | 196 50 425 A1 | 6/1998 |
| DE | 198 57 074 A1 | 6/2000 |
| DE | 103 58 086 A1 | 7/2005 |
| DE | 10 2009 009 567 A1 | 9/2009 |
| EP | 2 767 726 A1 | 8/2014 |
| GB | 1 389 865 | 4/1975 |
| JP | 53-127972 A | 11/1978 |
| RU | 2 087 769 C1 | 8/1997 |

OTHER PUBLICATIONS

German-language Written Opinion (PCT/ISA/237) issued in PCT Application No. PCT/EP2016/074156 dated Jan. 26, 2017 (five (5) pages).

Russian-language Office Action issued in counterpart Russian Application No. 2018115526/11(024165) dated Feb. 28, 2019 with English translation (11 pages).

Chinese-language Office Action issued in counterpart Chinese Application No. 201680065377.2 dated Mar. 5, 2019 with English translation (11 pages).

International Preliminary Report on Patentability (PCT/IB/326 & PCT/IB/373) issued in PCT Application No. PCT/EP2016/074156 dated Apr. 19, 2018, including English translation of document C2 (German-language Written Opinion (PCT/ISA/237) previously filed on Apr. 9, 2018) (eight (8) pages).

Hindi-language Office Action issued in Indian Application No. 201837012808 dated Mar. 2, 2020 with English translation (six (6) pages).

* cited by examiner

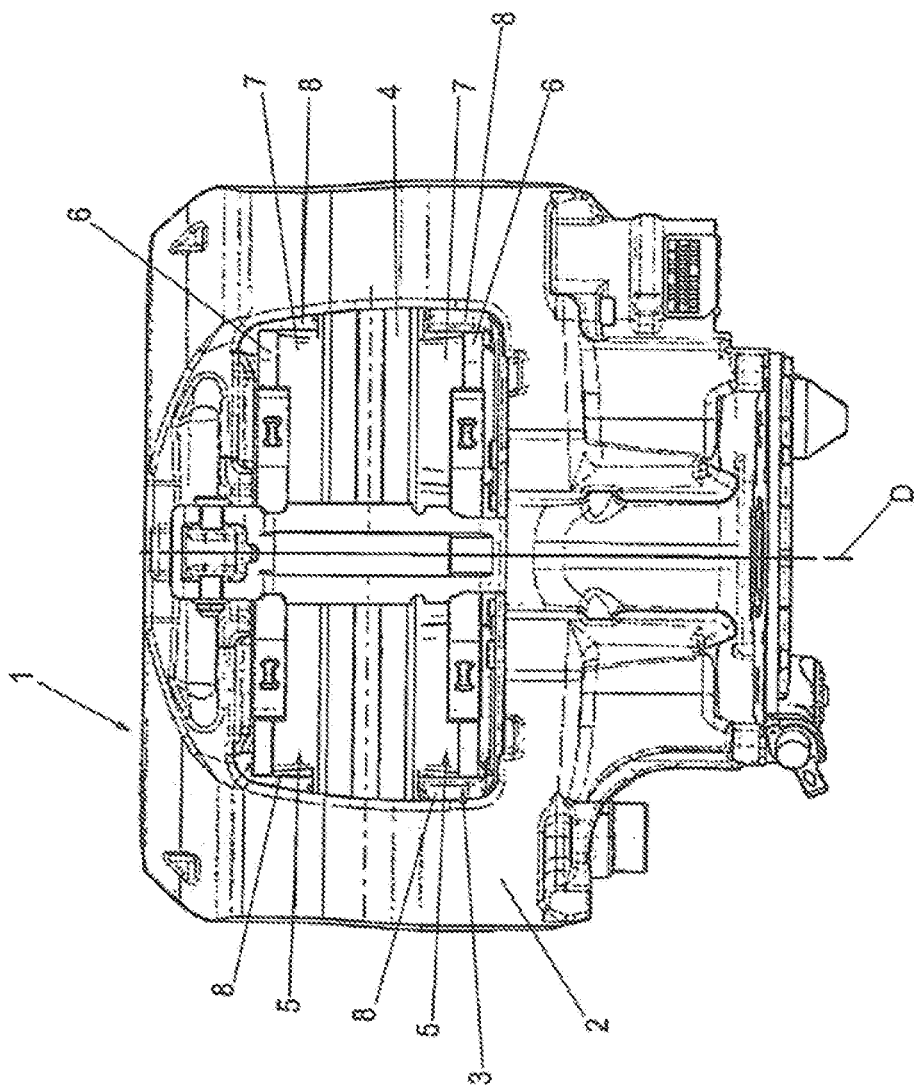

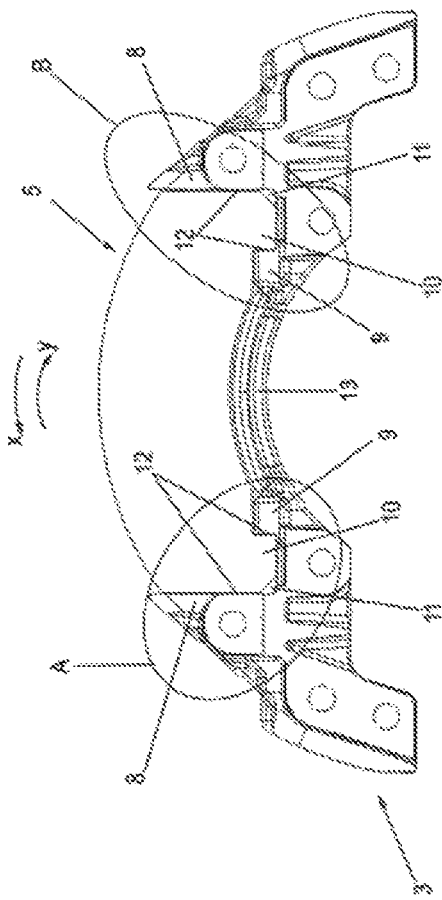

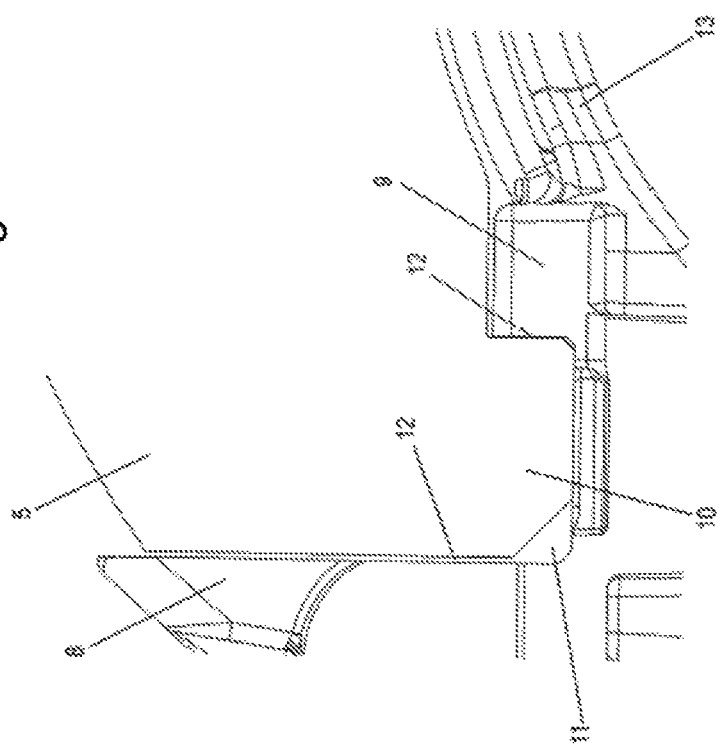

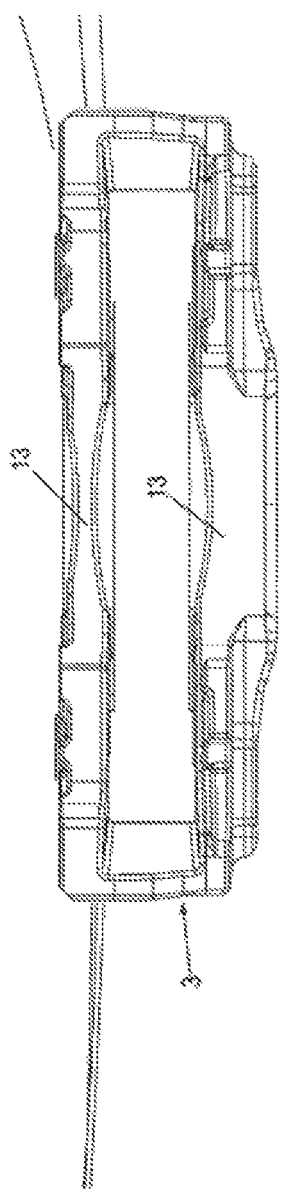

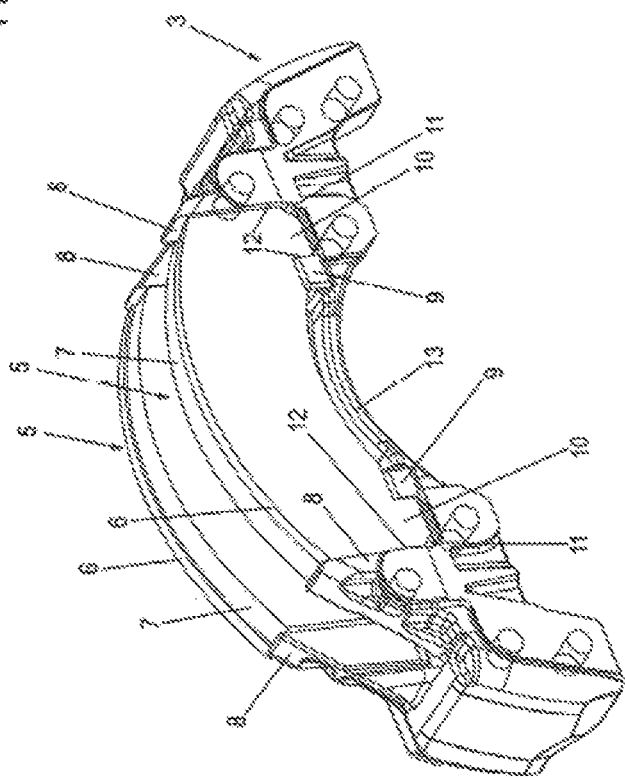

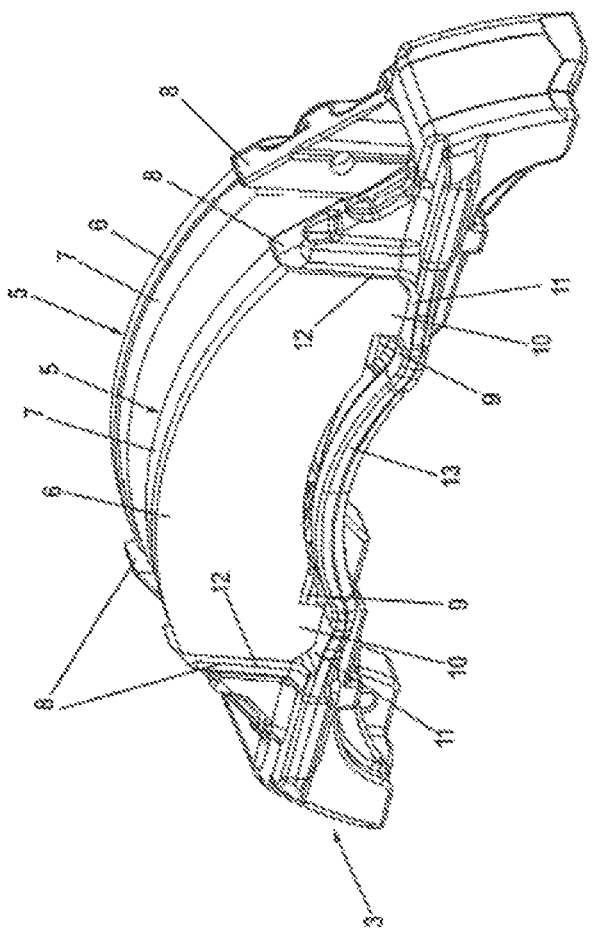

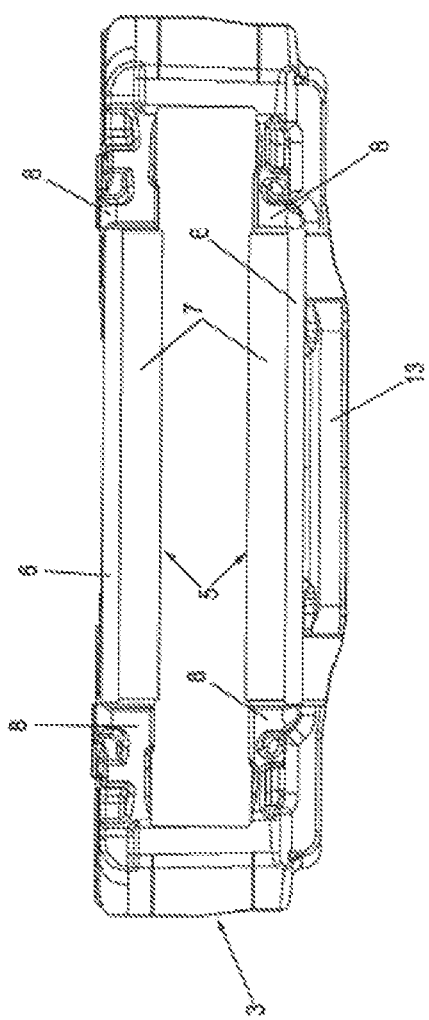

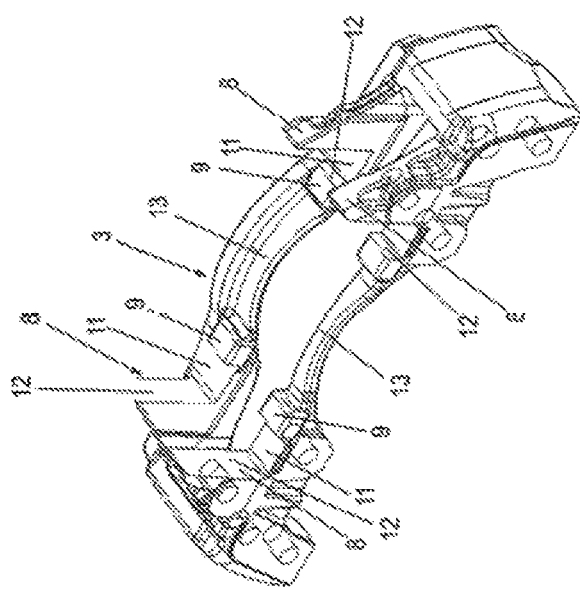

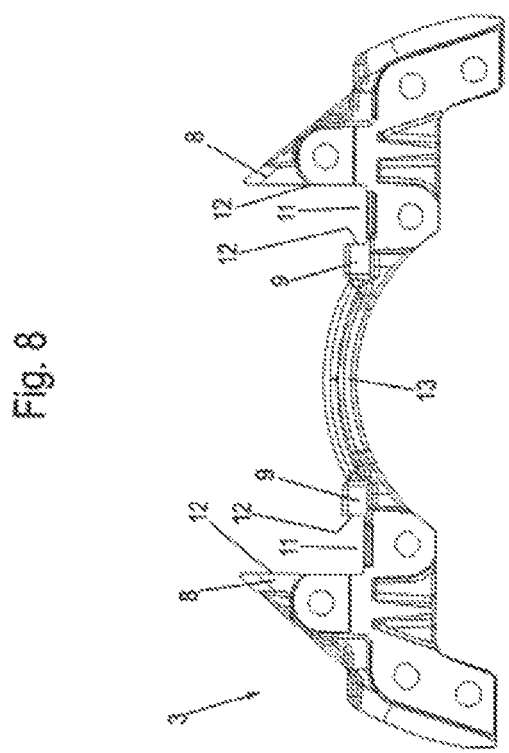

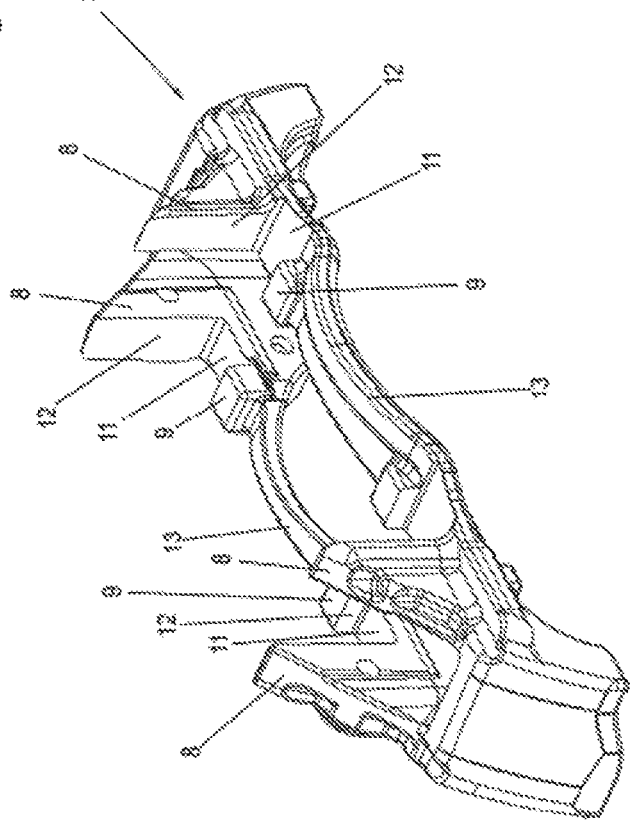

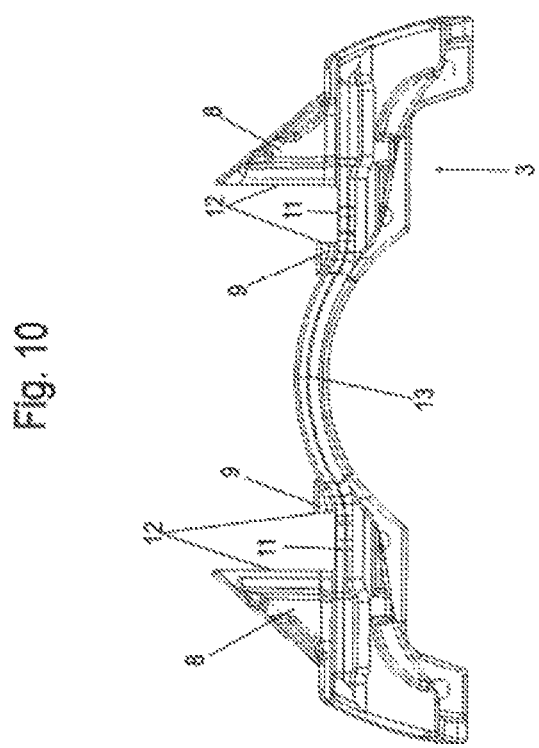

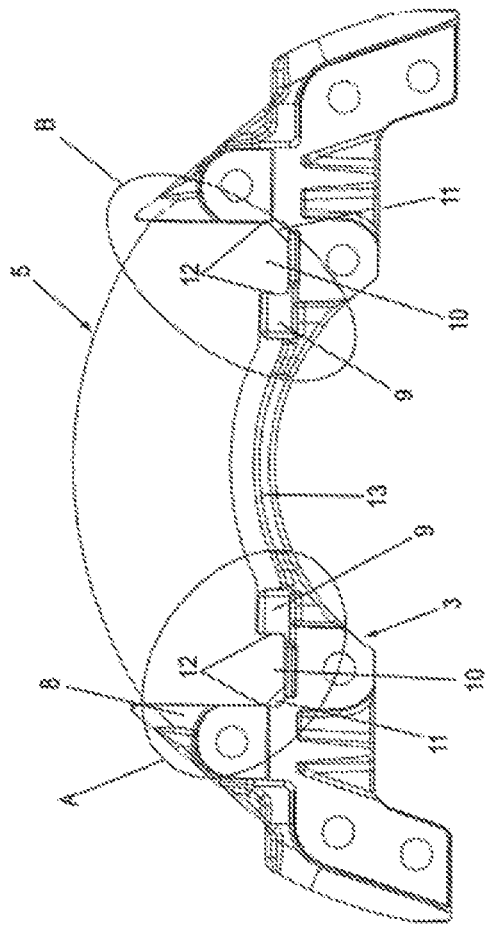

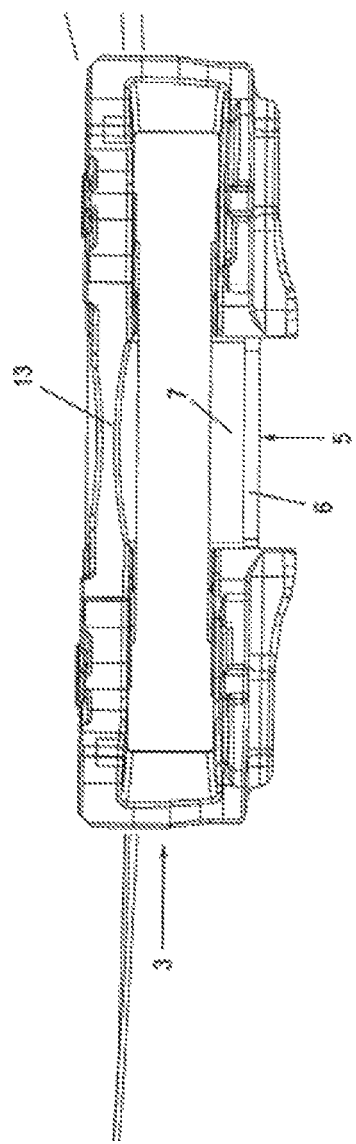

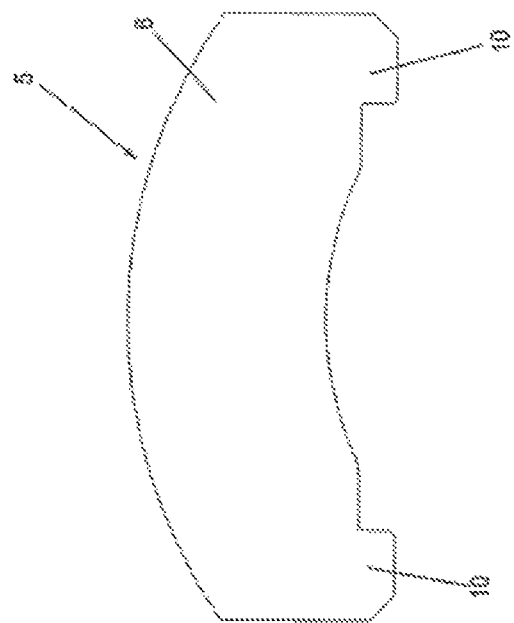
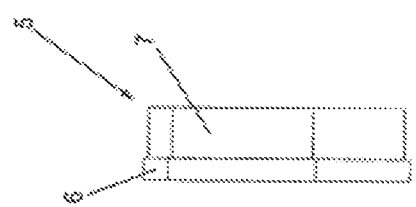

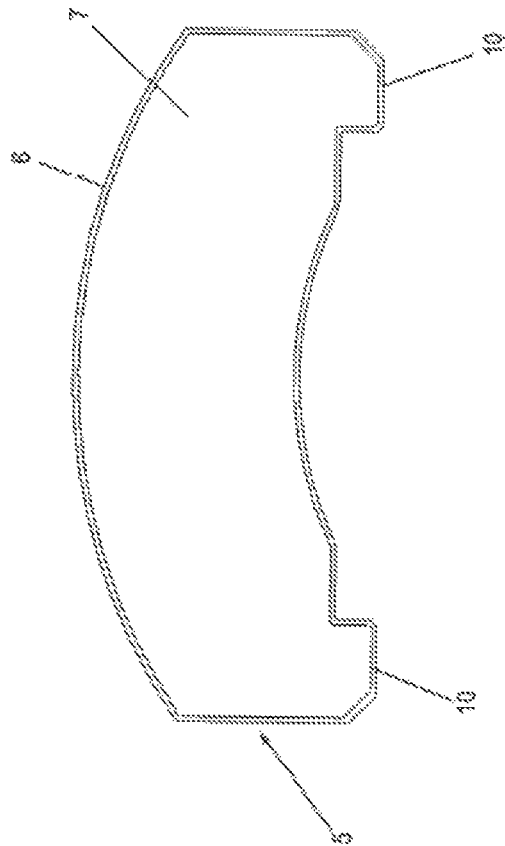

DISC BRAKE FOR A UTILITY VEHICLE

CROSS REFERENCE TO RELATED APPLICATIONS

This application is a continuation of PCT International Application No. PCT/EP2016/074156, filed Oct. 10, 2016, which claims priority under 35 U.S.C. § 119 from German Patent Applications Nos. 10 2015 117 285.2, filed Oct. 19, 2015, and 10 2016 104 969.7, filed Mar. 17, 2016 the entire disclosures of which are herein expressly incorporated by reference.

BACKGROUND AND SUMMARY OF THE INVENTION

The invention relates to a disc brake for a commercial vehicle.

Such disc brakes, also referred to as sliding caliper disc brakes, are well known. The brake pads here, each comprising a pad-carrier plate and a friction lining retained thereon, are pushed in the direction of the brake-disc axis into the pad slots of the brake carrier, which is retained at a fixed location on the vehicle.

During braking, when the brake pads are pressed against the brake disc, the friction fit between the friction lining of the respective brake pad and the brake disc gives rise to the brake pad being subjected, in the direction of rotation of the brake disc, to a torque which is absorbed by the exit-side brake carrier lug.

However, over the course of operation of the brake pads, this results in so-called tangential diagonal wear to the brake pads such that, as seen in the main braking direction, i.e. when the commercial vehicle is travelling forwards, said brake pads wear to a more pronounced extent on the entry side than on the exit side.

It is therefore necessary for the brake pads, as soon as they reached their wear limit in the regions which are worn to a relatively pronounced extent, to be changed over, there still being usable wear volume available in the remaining regions of the brake pad or of the friction linings.

Of course, this stands in the way of operational-cost optimization, which is a constant aim, in particular also because commercial vehicles are usually equipped with a multiplicity of disc brakes, each having the aforementioned problems.

Although the prior art discloses disc brakes of which the brake pads have form-fitting elements which engage in a corresponding manner in the respective brake carrier, the form fits produced thereby are not suitable for preventing the problem of diagonal wear. In particular, the brake pads are not retained in a form-fitting manner in both directions of rotation of the brake disc.

DE 21 38 776 A discloses a disc brake in which the brake pads are mounted in guide grooves of the brake carrier by way of laterally formed protrusions, wherein, during braking, the entry-side protrusion is supported radially on the upper wall of the guide grooves without the brake carrier being capable of effectively absorbing a torque in this region. A comparable design is dealt with in DE 22 55 678 A.

It is an object of the invention to develop a disc brake of the type in question such that the service life of the brake pads and the operational costs are lowered.

The configuration of the disc brake according to the invention, in particular of the corresponding parts of the brake carrier, on the one hand, and of the brake pads, on the other hand, means that the torque which acts on the respective brake pad during braking acts on the entry-side region of the brake carrier, in particular on the entry-side brake carrier lug, and therefore the brake pad acts more or less as a tie.

As a result of the at least one form fit with the brake carrier, which according to the invention is provided on the entry side, the brake pad is more or less braced with the brake carrier in both directions of rotation of the brake disc. That is to say the torque acting on the brake pad is absorbed in the first instance exclusively by the entry-side region of the brake carrier, in particular, in this case, the brake carrier lug.

In the case of relatively large braking moments, which apply torque to the brake pads, it is possible for the entry-side brake carrier lug to flex to the extent where the brake pad, on the exit side abuts the associated brake carrier lug. It is always ensured, in the case of such torque absorption, that there is no diagonal wear to the brake pad.

The form fit between the brake pad and the brake carrier can be produced in different ways.

According to one idea of the invention, provision is made for the respective pad-carrier plate, on the side which is directed towards the floor of the brake carrier, to have a protrusion, which, as seen in the direction of rotation of the brake disc, butts against at least one supporting surface of the brake carrier, said supporting surface being formed by a protuberance arranged on the floor of the pad slot. It is also conceivable for the associated brake carrier lug to be used as a further supporting surface, and therefore the protrusion is positioned between the two supporting surfaces and butts against the same.

The two mutually opposite supporting surfaces, accommodating the associated protrusion of the brake pad between them, are arranged parallel to one another, are of smooth-surface design and run tangentially to the brake disc, and therefore the brake pad can be pushed in radially, as in relation to the brake disc.

According to the invention, it is indeed the case that the brake pad is supported on the brake carrier in both directions of rotation of the brake disc at least on the entry side, but it is preferred for the support to be provided both on the entry side and on the exit side, and therefore the brake pad may be of mirror-symmetrical design, as seen in relation to a radial centre axis. Depending on the direction of rotation of the brake disc, i.e. depending on whether travel is in the forward direction or in reverse, the entry side and exit side change round. That is to say the entry side for forward travel becomes the exit side for reverse travel, and vice versa.

Another variant of the invention makes provision for the support to be provided by a form fit between the brake pad and the brake carrier, for which purpose a claw-like formation is provided in that peripheral region of the pad-carrier plate which is directed towards the brake carrier lug, and said claw-like formation has an accommodating groove, into which is fitted a dimensionally adapted retaining pin of the brake carrier lug. This therefore also achieves the situation where the brake pad is arrested on the brake carrier lug in both directions of rotation of the brake disc.

Instead of a claw-like formation of the brake pad and a retaining pin of the brake carrier lug, it is also, of course, possible for the brake carrier lug to be of claw-like design and for the brake pad to be provided with a retaining pin, which engages in the groove formed in the brake carrier lug.

Otherwise, the form-fitting elements or formations of the brake pad are arranged on the brake carrier plate.

By virtue of the brake pad being more or less clamped in the direction of rotation of the brake disc both on the entry side and the on the exit side, it is possible for the corresponding brake pad to perform the function of a strut if one of the two pad slots is formed without a strut connecting the brake carrier lugs to one another.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a plan view of a disc brake according to the prior art.

FIGS. 2A-23B show different views of an embodiment of the invention.

DETAILED DESCRIPTION OF THE DRAWINGS

Figure 2C:
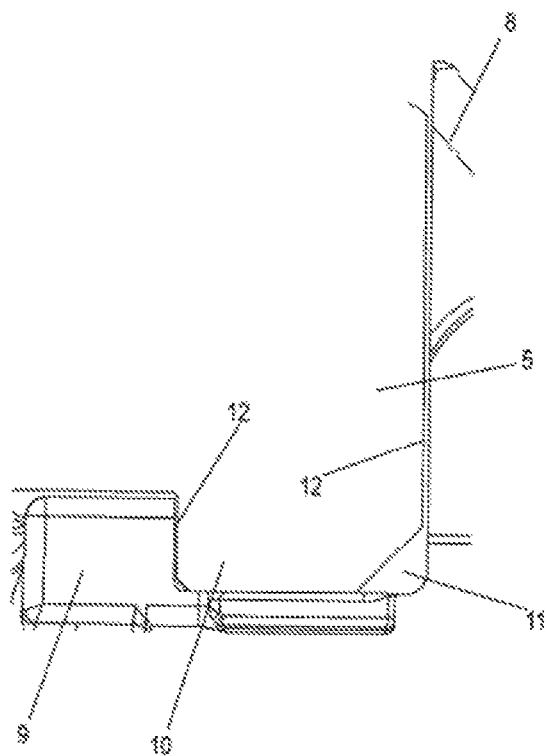

FIG. 1 depicts a disc brake 1 according to the prior art, having a brake caliper 2, which engages over a vehicle-mounted brake disc 4 and is mounted on a fixed-location brake carrier 3 such that it can be displaced axially, as seen in relation to the axis D of the brake disc 4.

The brake carrier 3 has arranged in it, on either side of the brake disc 4, brake pads 5, each comprising a pad-carrier plate 6 and a friction lining 7 fastened thereon.

The brake pads 5 here are positioned in a pad slot, which is bounded on either side by brake carrier lugs 8.

FIGS. 2-21 and 24 each illustrate a brake carrier 3 according to the invention as a single unit, wherein FIG. 2A) represents a front view of the brake carrier 3 with a brake pad 5 inserted, whereas FIGS. 2B) and 2C) represent enlarged details A and B of the structural unit according to FIG. 2A).

It can be seen that, according to the invention, each brake pad 5 is retained on the brake carrier 3 by a form fit in both directions of rotation x, y of the brake disc 4 at least on the entry side, and in the example also on the exit side.

For this purpose, in the region of the brake carrier lugs 8, the brake carrier 3 has a respective protuberance 9 formed on the floor of the pad slot, said protuberance projecting in the direction of the brake pad 5 at a distance from the associated brake carrier lug 8.

On their side which is directed towards the brake pad 5, the brake carrier lugs 8 each have a supporting surface 12, which runs tangentially as in relation to the brake disc 4, like a supporting surface 12 of the protuberance 9, which is directed towards the supporting surface 12 of the brake carrier lug 8 and runs parallel thereto.

This therefore forms a recess 11, into which projects a protrusion 10 of the brake pad 5, which is retained by a form fit in both directions of rotation of the brake disc 4 by way of lateral abutment against the two side surfaces 12 of the brake carrier lug 8 and of the protuberance 9, wherein the supporting surfaces 12 form an abutment in both directions of rotation x, y of the brake disc 4.

It can be seen in FIG. 3, which represents a bottom view of the brake carrier 3, that the brake carrier lugs 8, which are assigned to the respective pad slot, are connected to one another by a respective strut 13.

FIG. 4 shows a perspective view of the unit made up of the brake carrier 3 and brake pads 5, wherein this figure depicts the front view, whereas FIG. 5 represents the rear view, which, as seen in the installed position, is directed towards a wheel rim of the commercial vehicle.

FIG. 6 shows a plan view of the brake carrier 3 with brake pads 5 inserted.

FIGS. 7-10 show various views of the brake carrier 3 as a single unit, wherein the brake carrier lugs 8 of each pad slot are connected to one another by a strut 13.

FIGS. 12-15 depict a brake carrier 3 with brake pads 5 inserted, the brake carrier lugs 8 of just one pad slot being connected by a strut 13, whereas the brake carrier lugs 8 of the other pad slot are not connected by such a strut 13.

Here, then, the brake pad 5 inserted performs the function of the strut 13, which then acts more or less in the manner of a tie bar, to be precise in that it is clamped in, both on the entry side and on the exit side, between the protuberances 9 and the brake carrier lugs 8 with the protrusion 10 formed thereon.

FIG. 12 shows the bottom view of the brake carrier 3, whereas FIG. 11A) represents a front side, with strut 13, wherein, as seen in the installed position of the disc brake or of the brake carrier 3, the front side forms the side which is directed away from a wheel rim.

Figure 11B:
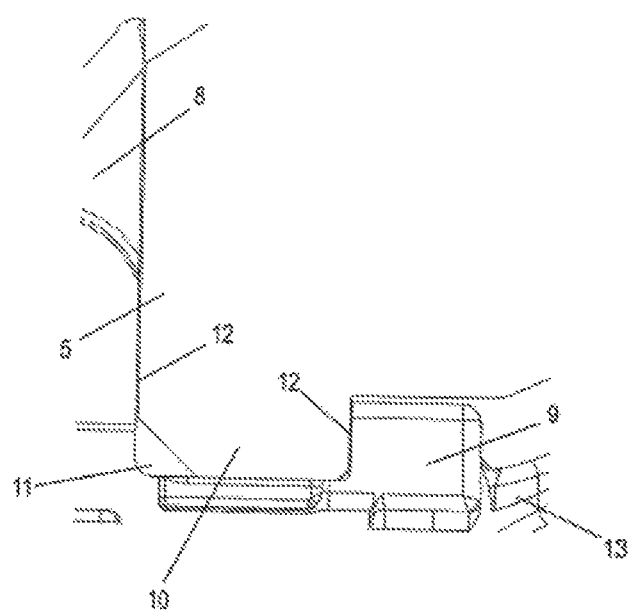
Figure 11C:
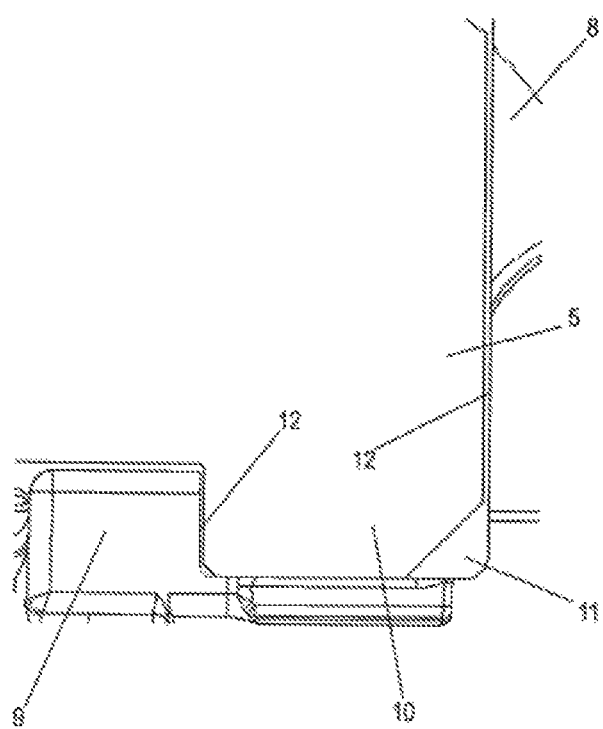

FIGS. 11B) and 11C) respectively represent an enlarged detail A (FIG. 11B) and B (FIG. 11C).

Figure 13:
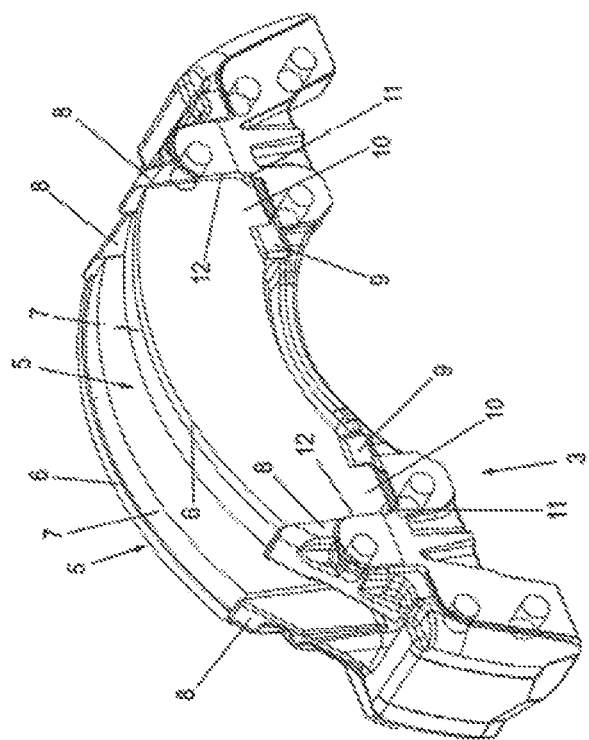
Figure 14:
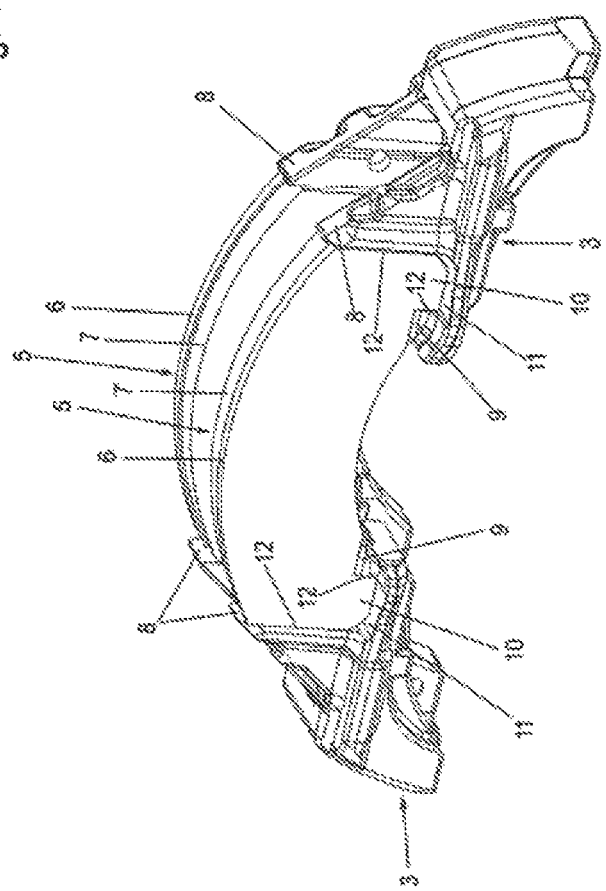

FIG. 13 shows a perspective illustration of the view in FIG. 11A), while FIG. 14, likewise in the form of a perspective depiction, represents the rear side of the brake carrier 3 with brake pads 5 inserted, said rear side, as mentioned, being directed towards a wheel rim during operation, wherein the absence of the struts 13 in the region of the pad slot is clearly visible here.

Figure 15:
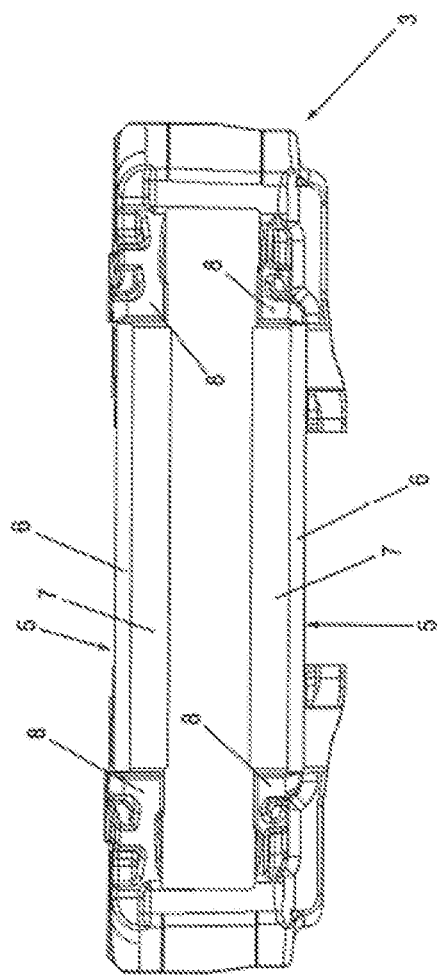

FIG. 15, finally, represents the plan view of the brake carrier 3.

Figure 16:
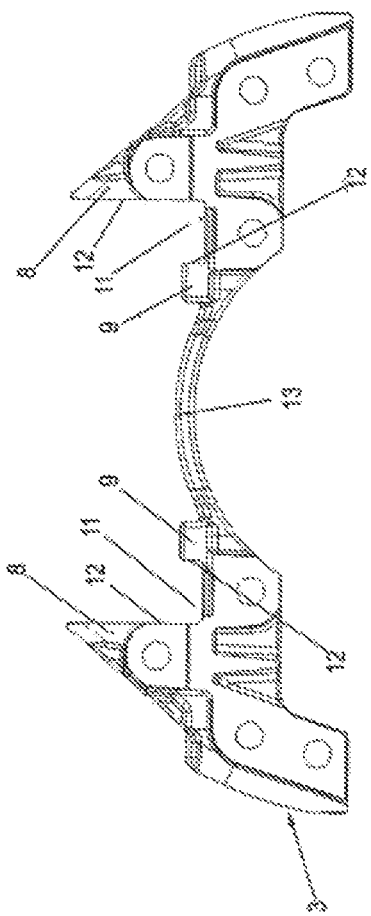
Figure 17:
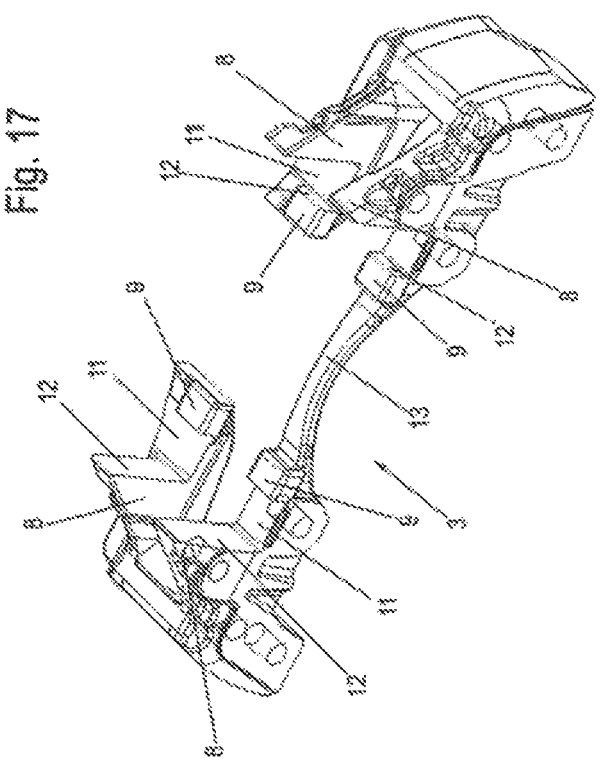
Figure 18:
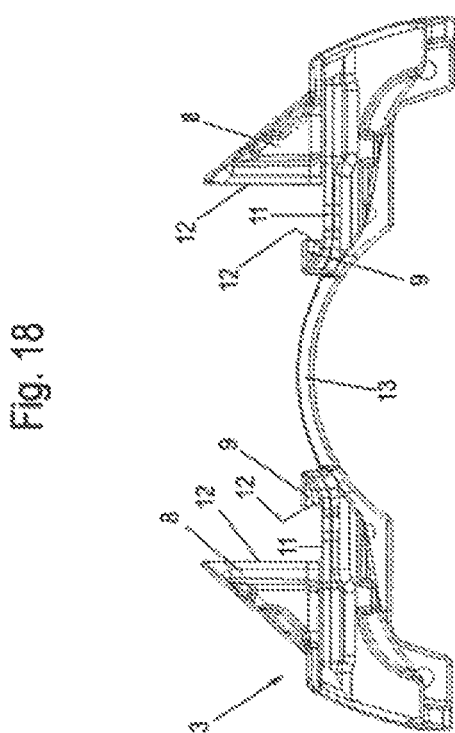
Figure 19:
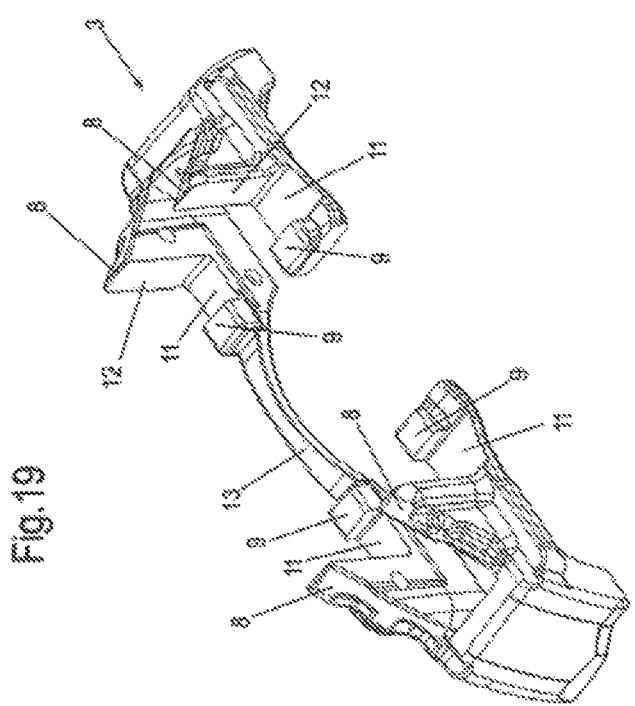
Figure 20:
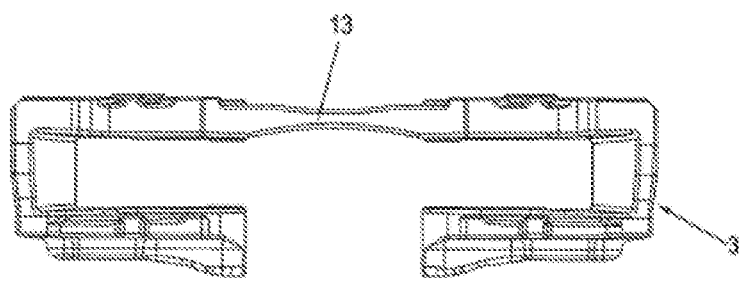
Figure 21:
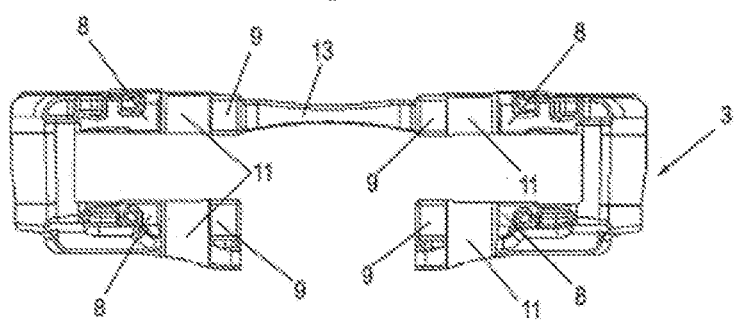

FIGS. 16-21 show the brake carrier 3 according to FIGS. 11-15 on its own, wherein FIG. 16 the front side according to FIG. 13, FIG. 17 a perspective view of the brake carrier 3, as seen from the front side, and FIG. 19 a perspective view as seen from the rear side. FIG. 18 represents the rear side of the brake carrier 3 in accordance with the depiction in FIG. 14, whereas FIG. 20 shows a bottom view of the brake carrier 3 and FIG. 21 shows a plan view of the brake carrier 3.

FIG. 22A) shows a brake pad with a front view of the pad-carrier plate 6, the protrusions 10 being formed on said brake pad. FIG. 22B) shows a side view of the brake pad 5.

FIG. 23A) is a view of the brake pad 5 on the friction lining 7, which is set back slightly in relation to the outer contour of the pad-carrier plate 6, but is of identical contour. FIG. 23B), finally, represents the brake pad 5 likewise in side view.

Figure 24A:
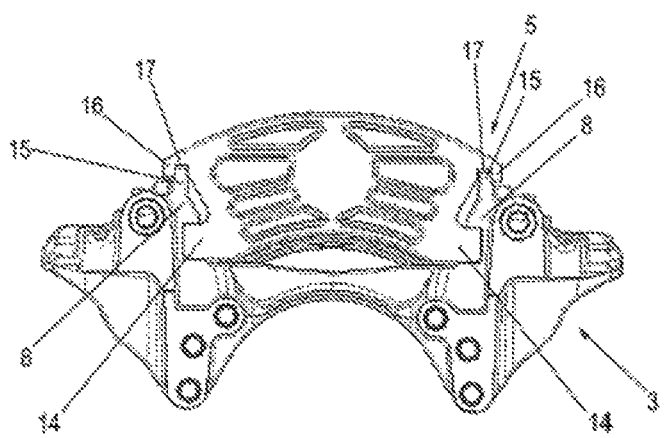
FIG. 24A-24C show various illustrations of a further embodiment of the invention.
Figure 24B:
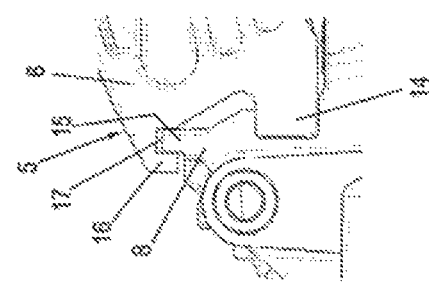
Figure 24C:
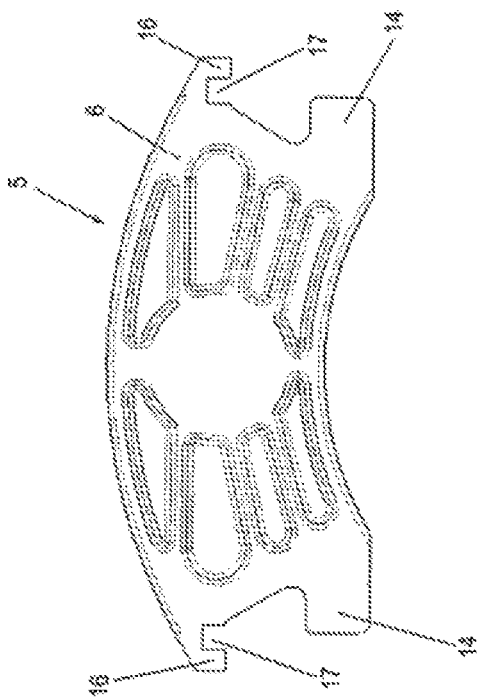

A further exemplary embodiment of the invention is illustrated in FIGS. 24A-24C. FIG. 24A) shows a brake pad 5 inserted into the brake carrier 3, wherein, for a form fit between the brake pad 5 and the brake carrier 3, the pad-carrier plate 6, as can be seen clearly in particular in FIG. 24C), has claws 16 formed on the mutually opposite peripheral regions bounding the longitudinal sides of the brake pad 5, each of the claws having a groove 17, in which a retaining pin 15 formed on the brake carrier lug 8, in the direction away from the floor of the pad slot, engages such that the brake pad 5 is retained in both directions of rotation of the brake disc 4, to be precise in each case by one of the two form fits.

FIG. 24B) illustrates the attachment of the brake pad 5 on an enlarged scale as a detail of FIG. 24A). It can be seen here, and also in FIG. 24C), which represents the brake pad 5 as a single unit, that an extension 14 is formed on the pad-carrier plate 6, on the side located opposite the claw 16, said extension engaging in a matching mount of the brake carrier lug 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Disc brake
2 Brake calliper
3 Brake carrier
4 Brake disc
5 Brake pad
6 Pad-carrier plate
7 Friction lining
8 Brake carrier lug
9 Protuberance
10 Protrusion
11 Recess
12 Supporting surface
13 Strut
14 Extension
15 Retaining pin
16 Claw
17 Groove

What is claimed is:
1. A disc brake for a commercial vehicle, comprising:
a brake disc having a rotation axis;
a brake carrier configured to straddle the brake disc and be mounted on the vehicle;
a brake caliper configured to straddle the brake disc and be retained on the brake carrier such that the brake caliper is displaceable axially parallel to the rotation axis; and
brake pads each having a pad-carrier plate and a friction lining fastened thereon,
wherein
the brake carrier has lining slots on opposite sides of the brake disc configured to receive the brake pads, the lining slots being bounded on entry and exit sides by opposing brake carrier lugs,
in the region of the brake carrier lugs, each brake carrier lug has a respective protuberance present on a floor of each lining slot,
each of the brake pads have at each opposing end of the brake pad in a circumferential direction a protrusion configured to butt against each respective protuberance, during braking the brake pads are supported on the brake carrier in the direction of rotation of the brake disc at least on the respective entry side brake carrier lugs, and
a distance between the protrusions of each brake pad is sized such that during a brake application event, the brake pad protrusions function as a tie between the respective brake carrier lug protuberances on the floor of each lining slot that inhibits separation of the respective protuberances and respective protrusions away from one another.

2. The disc brake according to claim 1, wherein
each respective protuberance and associated brake carrier lug cooperate to form a recess configured to receive each respective brake pad protrusion.

3. The disc brake according to claim 2, wherein
the respective protuberances and associated brake carrier lugs on mutually facing sides have supporting surfaces against which each respective protrusion abuts.

4. The disc brake according to claim 3, wherein
each respective protuberance and associated brake carrier lug supporting surfaces are parallel to one another.

5. The disc brake according to claim 4, wherein
the supporting surfaces are tangentially oriented relative to the brake disc.

6. The disc brake according to claim 3, wherein
a distance between supporting surfaces of two protuberances at opposite sides of a respective one of the lining slots is the same as a clear distance between the two protrusions at opposite sides of a respective brake pad.

7. The disc brake according to claim 3, wherein
the clear distance of the supporting surfaces of the respective protuberances and of the associated brake carrier lug in relation to one another is equal to, or slightly greater than, a width of each respective protrusion received between the respective supporting surfaces.

8. The disc brake according to claim 1, wherein
the brake carrier lugs of only one of the opposing lining slots are connected to one another by a strut.

9. The disc brake according to claim 1, wherein
a claw and a groove are located on at least an entry-side peripheral region of the brake pads, the claw and the groove being configured to receive a retaining pin of the associated brake carrier lug.

10. The disc brake according to claim 1, wherein
a claw and a groove are located on free ends of at least an entry-side brake carrier lug, the claw and the groove being configured to receive a retaining pin of the respective brake pad.

11. The disc brake according to claim 1, wherein
at a periphery region of the brake pads adjacent a floor of each lining slot, each brake pad includes at least one projecting extension configured to engage in an aperture of the respective adjacent brake carrier lug.

* * * * *